United States Patent [19]

Kashiwara et al.

[11] 4,050,539
[45] Sept. 27, 1977

[54] EXHAUST APPARATUS FOR INTERNAL COMBUSTION ENGINE

[75] Inventors: Teruo Kashiwara; Hiroshi Ichimaru, both of Osaka, Japan

[73] Assignee: Teruo Kashiwara, Osaka, Japan

[21] Appl. No.: 666,638

[22] Filed: Mar. 15, 1976

[30] Foreign Application Priority Data

Sept. 13, 1975  Japan .............................. 50-111497

[51] Int. Cl.² .......................... F01N 1/12; F01N 1/00
[52] U.S. Cl. ................................. 181/280; 181/228; 181/268
[58] Field of Search ................. 181/67, 66, 36 B, 41, 181/46

[56] References Cited

U.S. PATENT DOCUMENTS

| | | | |
|---|---|---|---|
| 2,557,687 | 6/1951 | Rainville | 181/67 |
| 3,235,003 | 2/1966 | Smith | 181/67 |
| 3,805,495 | 4/1974 | Steel | 181/67 |
| 3,913,703 | 10/1975 | Parker | 181/67 |

FOREIGN PATENT DOCUMENTS 804,593   8/1936   France .................................. 181/67

Primary Examiner—Stephen J. Tomsky
Attorney, Agent, or Firm—George H. Mitchell, Jr.

[57] ABSTRACT

An exhaust apparatus for internal combustion engines comprises an outer pipe having an enlarged intermediate portion and at least one end portion having nearly the same diameter as the exhaust pipe from the engine for connection thereto, an inner pipe of approximately the same diameter as the exhaust pipe, a plurality of helical passages provided between the inner and outer pipes and sets of fins arranged inside the inner pipe at each end to impart vortical flow of gases passing through the inner pipe and to accelerate the gases through the helical passages and absorb them from the engine, the end portion of the outer pipe being connected with the exhaust pipe by means of an encircling clamping ring.

7 Claims, 8 Drawing Figures

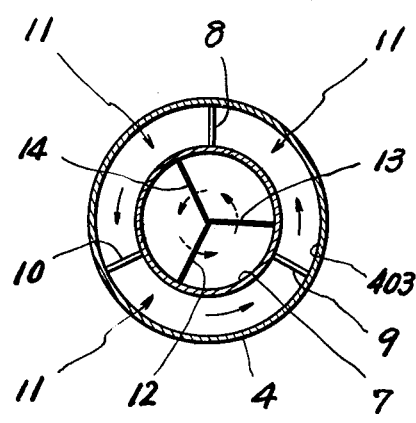
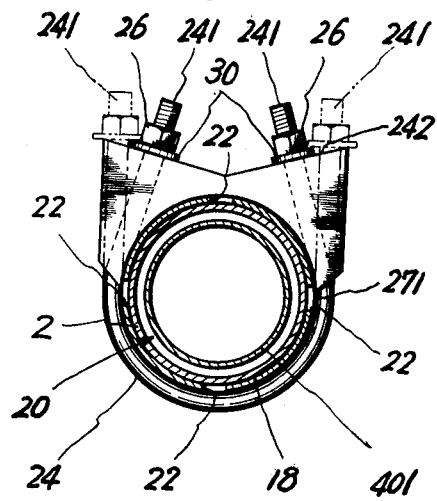
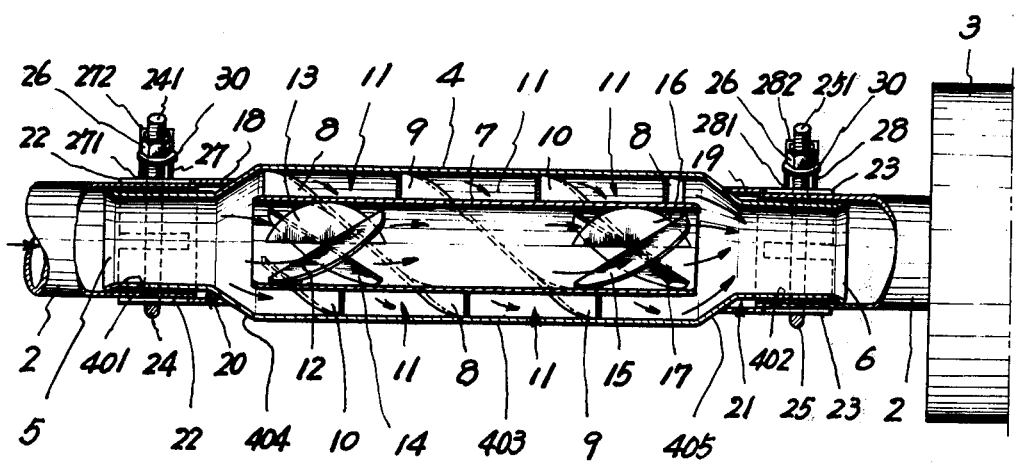

EXHAUST APPARATUS FOR INTERNAL COMBUSTION ENGINE

The present invention relates to an exhaust apparatus for internal combustion engines which may be generally inserted in the exhaust pipe, and can be designed to provide a highly efficient exhaust system.

It is an object of the invention to provide an exhaust apparatus for internal combustion engines which is capable of absorbing the combustion gas from the internal combustion engine and accelerating it by force within the apparatus and exhausting it out of the system so as to increase the efficiency of the engine.

Another object of the invention is provide an exhaust apparatus for internal combustion engines which is simple in construction, and which can be easily assembled with the exhaust pipe in tightly fixed connection thereto.

Other features and advantages of the invention will be apparent from the following description taken in connection with the accompanying drawings wherein;

FIG. 3 is a sectional view taken along the line A—A of FIG. 2;

FIG. 4 is a sectional view taken along the line B—B of FIG. 2;

FIG. 5 is a sectional side elevation;

Figure 1:
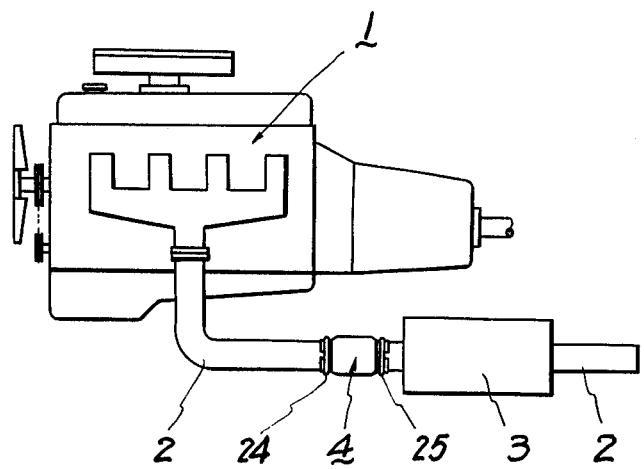
FIG. 1 is a side elevation of a preferred embodiment of the present invention.
Figure 2:
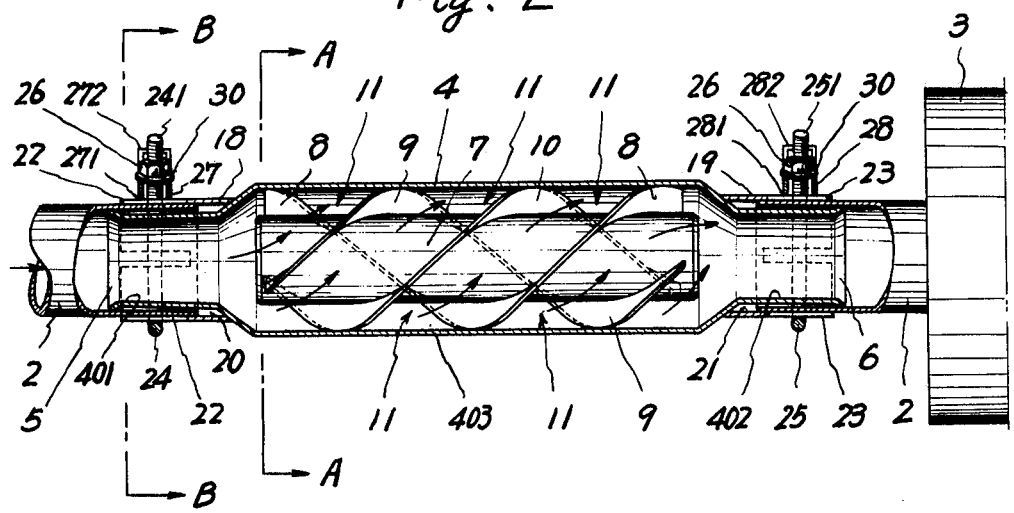
FIG. 2 is an enlarged vertical, sectional view.

As illustrated in FIG. 1, numeral 1 indicates generally an internal combustion engine, that is particularly adapted for use in an automobile. Numeral 2 is an exhaust pipe for discharging the exhaust combustion gas of the engine 1. Numeral 3 is a muffler. As illustrated in FIG. 2, numeral 4 is an outside pipe which is composed of a large diameter portion 403, small diameter end portions 401 and 402, and tapered portions 404 and 405 formed between the large diameter intermediate portion 403 and small diameter end portions 401 and 402. The angle of taper of elements 404 and 405 is approximately 45°. Also, the periphery of each of said small diameter portions 401 and 402 is widened to the outside near the outlet and inlet 5 and 6 of the pipe 4, and these widened ends are formed with a diameter for insertion into the exhaust pipe 2.

Numerals 8, 9 and 10 are helical plates which are positioned at intervals between the outside pipe 4 and the inside pipe 7 so as to make a plurality of helical passages 11. As illustrated in FIG. 2, said plates are mounted on the inside pipe with the helix and angle of thread of more than 45°. Also, as illustrated in FIG. 3, these plates 8, 9 and 10 are radially mounted on the inside pipe 7 and angularly spaced at 120° from each other. Further, said plates 8, 9 and 10 may have a pitch of one or two turns for the length of the inside pipe 7.

As illustrated in FIG. 5, numerals 12, 13, 14, 15, 16 and 17 are semi-elliptical fins which are provided within the inside pipe 7 and are placed near both ends of the pipe. As illustrated in FIG. 3, the fins 12, 13 and 14 and 15, 16 and 17 are also radially mounted on the inside surfaces of said pipe 7 in two groups of three, the fins of each group being angularly spaced at 120° from each other and have a helical angle of more than 45° with respect to the longitudinal axis of the pipe, so that the exhaust gases passing through this pipe 7 are transformed into a vortical flow by these fins 12–17.

Numerals 18 and 19 are clamping pipes which are attached at both ends of the pipe 4. The inside diameter of the pipes 18 and 19 are larger than the small diameter end portions 401 and 402 so as to form the angular spaces 20 and 21 to receive the two adjacent ends of the exhaust pipe 2. Also, notches 22 and 23 are prepared at each end of the clamping pipes 18 and 19, so that the diameter of the clamping pipes 18 and 19 can be contracted and expanded. When the clamping pipes are in place, since the small ends of the portions 401 and 402 are projected into the clamping pipes 18 and 19, and have widened ends 5 and 6, the exhaust pipe can be easily connected tightly to the surfaces of the portions 401 and 402.

Numerals 24 and 25 are U-bolts for clamping the pipes 18 and 19. Numerals 27 and 28 are shell-type washers in which the U-bolts 24 and 25 are inserted. The washers 27 and 28 have circular surfaces 271 and 281 having the same radius as the pipes 18 and 19 for fitting in close engagement therewith. V-shaped tapered surfaces 272 and 282 are formed on the upper sides of the washers 27 and 28. Also, the threaded parts 241 and 251 of the bolts are shown in parallel in FIG. 4 and projected upwardly from the tapered surfaces 272 and 282 for attachment by the nuts 26. As illustrated in FIG. 4, when the nuts 26 are drawn down on the threads 241 and 251 with the washers 30, both ends of U-bolts 24 and 25 approach each other while moving along the tapered surfaces 272 and 282, so that the circumference of the clamping pipes 18 and 19 are encircled by the deformation of the U-bolts 24 and 25.

Figure 6:
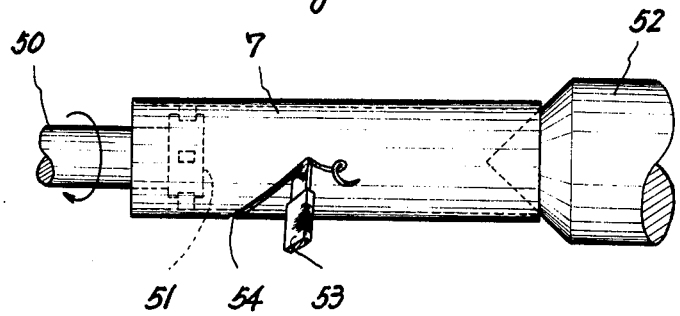
FIG. 6 and FIG. 7 illustrate one method for making an assembling the invention.
Figure 7:
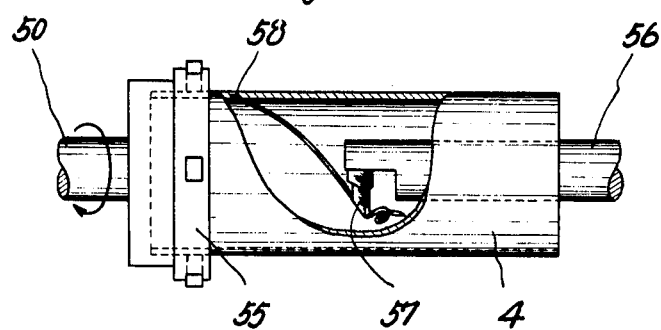
Figure 8:
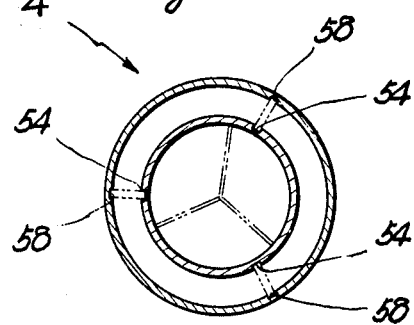
FIG. 8 is an end view of the assembly.

As shown in FIG. 6, to support the helical plates 8, 9 and 10 between the intermediate portion 403 and the inside pipe 7, a chuck 51, connected with the rotary shaft 50 of an engine lathe for rotation at constant speed, is inserted into and fixed in one end of the inside pipe 7 so as to support it, the other end of the pipe 7 being supported by an arm 52 for holding it on a fixed axial line. Then, a cutting tool 53 is moved along the axial direction of the inside pipe 7 at a constant speed in contact with the surface of the pipe, while at the same time, the inside pipe is rotated with the movement of the cutting edge so as to make the helical grooves 54. These grooves 54 are for receiving the edge of each of the plates 8, 9 and 10, as shown in FIG. 7, a chuck 55 which is connected with the rotary shaft 50 of an engine lathe for rotation at constant speed is fixed on the outside pipe 4 so as to support it at one end, while an arm having a cutting tool 57 is inserted within the outside pipe 4 and is moved along at an axial direction at constant speed by means of an arm 56, while contacting the inside surface of the pipe 4. Thus, when the pipe 4 is rotated with the cutting edge 57 being axially moved, the three helical grooves 38 are formed. These grooves 58 are adapted to receive the other marginal edges of the helical plates 8, 9 and 10 on the inside surface of the pipe 4.

Each of the cutters 53 and 57 is disposed at an angle of 45° with respect to the axis of the pipes 4 and 7 for moving along the paths of the grooves 54 and 58. Also, each cutting tool 53 and 57 is disposed at an angle of 45° with respect to the surface of each pipe 4 and 7 for forming the grooves in each surface.

While the inside pipe 7 is assembled with the outside pipe 4, the grooves 54 and 58 are arranged concentrically facing each other, so that opposite margins of the helical plates 8, 9 and 10 are received in each of the respective grooves 54 and 58. Then, the plates 8, 9 and 10 are inserted in the space between the pipe 4 and the pipe 7 and these pipes are arranged on the same axial line.

With respect to the means for fixing the helical plates 8, 9 and 10, it is also possible to use another method such as welding plates 8–10 on either pipe 4 or 7. Also, it is possible to eliminate the grooves 54 and 57 and weld both margins of plates 8–10 to the respective pipes 4 and 7.

In operation, when the outside pipe 4 is installed in connection with exhaust pipe 2, a portion of the pipe 2 is cut out and the two ends remaining are inserted and tightly fixed in the spaces 20 and 21 which are formed between the small diameter portions 401 and 402 and the clamping pipes 18 and 19. Then, the curved portions of U-bolts 24 and 25 are fitted around the circumference of the clamping pipes 18 and 19 having the notches 22 and 23. The threaded parts 241 and 251 of the U-bolts are inserted and assembled with the shell-type washers 27 and 28, and arcuate surfaces 271 and 281 of the washers 27 and 28 are fitted on the circumferences of the clamping plates 18 and 19. And the nuts 26, with washers 30, are tightened down on the tapered surfaces 272 and 282. As illustrated in FIG. 4, as the nuts 26 are tightened, they slide toward the center of the tapered surfaces 272 and 282 so that a strong connection results. Thus, the clamping pipes 18 and 19 may be gripped by the center portion of the U-bolts 24 and 25 as the bolts are tightened on the clamping pipes 18 and 19 and the shapes of the U-bolts are transformed as a result. Under the circumstances, substantially the entire circumferences of the clamping pipes 18 and 19 are equally engaged by the U-bolts 24 and 25 and the shell-type washers 27 and 28 so that the outside pipe 4 can be tightly assembled on the exhaust pipe 2.

As mentioned above, the outside pipe 4 is connected and fixed with the exhaust pipe 2, the exhaust gas of the engine 1 flows to the large diameter part 403 from the inlet 5 through the small diameter portion 401. These exhaust gases flow in the inside 38 are transformed into a vortical flow by direction of the fins 12–14 and they flow out toward the outlet 6 through the fins 15–17. Thus, said vortical flow initiated by fins 12–14 is further conducted and extended toward the outlet 6. Another portion of the exhaust gas enters the helical passages formed in the space 11 and is also transformed into a vortical flow. Therefore, the exhaust gas is transformed into double vortical flows through the plurality of helical passages 11 and the inside pipe 7, but the flow passing through the passages 11 is faster than the other flow passing through the inside pipe 7. Further, there occurs a phenomenon in which both helical flows at their different speeds are joined and compressed at the outlet of said pipe 7. And, since the vortical flow which passed at high speed through the passages 11 is jetted out at the outlet of the pipe 7, the exhaust gas passing within the inside pipe 7 is absorbed and exhausted out toward the outlet 6. Also, when the speed of the exhaust gas passing through the pipe 7 is increased, since the effect of the vortical flow is enlarged by the fins 12–14 at the same time, the inducement of these fins near the inlet of inside pipe 7 is also enlarged, so that the vortical flow is more pronounced and is more increased toward the inlet 5, the speed of the exhaust gas escaping into the plurality of helical passages becoming greater. Then, the vortical flow is jetted out from the outlet of the inside pipe 7 through fins 15–17, and the exhaust gas within the inside pipe 7 is absorbed, also the double vortical flows are joined at the outlet of the pipe 7, so that the double vortical flows are jetted out through the outlet 6. Therefore, the exhaust gas is absorbed from the engine 1 in a way to improve the exhausting effect and the combustion effect, and also the operating efficiency of the engine. In other words, the horsepower of the engine 1 may be increased, and specific consumption of fuel may be decreased, so that the engine can be more efficiently operated. Further, it is obvious from the above description that, since the combustion effect of the engine 1 is increased, poisonous gases, such as nitrogenous oxidized substances and non-combustion gases are reduced so that the environmental pollution of poisonous gas is minimized.

Also, since the large diameter portion 403 having the plurality of helical passages 11 is of larger diameter than the exhaust pipe 2 and the inside pipe 7 has a space between the fins 12–14 and 15–17, if an increased pressure of exhausting gas suddenly comes from the engine 1, that gas is dispersed near the inlet of the inside pipe 7 by the helical passages 11 and the space between the fins 12–14 and 15–17. At the same time, that exhaust gas can be accelerated and smoothly exhausted, so that the performance of the engine during acceleration and at high speed running can be improved.

Further, if the pressure of exhausting gas coming from the engine 1 is flowing at a comparatively low volume, the exhaust effect is not reduced because the exhaust gas of engine 1 is absorbed by the double vortical flows inside and outside of the pipe 7, and is then accelerated and exhausted through the fins 12–14 and 15–17. So that the output effect of the engine 1 is not decreased in low speed and also in low power outlet, and the effect of the engine can be improved when the car is going uphill. Further, as described above, the flowing effect of the exhausting gas and the effect of the engine can be equally improved without respect to various speeds of the engine and different conditions of driving, especially when a car is being driven at high speed or on an uphill grade.

When the outside pipe 4 is connected with the two sections of exhaust pipe 2 by means of their insertion into the spaces 20 and 21 and the clamping pipes 18 and 19 with the U-bolts 24 and 25, since the ends of the small diameter portions 401 and 402 are widened at their peripheries, these portions of the outside pipe 4 can be tightly connected with each end of the exhaust pipe 2 by means of the clamping pipes 18 and 19. Also, it is easy to determine the diameters of the portions 401 and 402 and the spaces 20 and 21, so that the manufacturing may be facilitated. Further, since each of the pipes 2, 18 and 19 and the small diameter portions 401 and 402 may be clamped with equal tightness by means of U-bolts 13 and 14 and the washers 15 and 16, the exhaust gas will not leak out from these couplings, and the U-bolts 24 and 25 will not come loose. Further, the exhaust noise may be reduced by the inside pipe 7, the helical plates 8, 9 and 10 and the fins 12–14 and 15–17, so that it is possible to conserve in the construction of the muffler 3, or to exclude the muffler entirely in some cases. Also, it is possible that the outside pipe 4 can be assembled on the exhaust pipe 2 on the end of the muffler 3 away from the engine so as to get the same effect rather than to connect the device between the engine and the muffler.

According to the invention, the effect of the internal combustion engine can be equally improved without regard to the variety of driving conditions of the engine while the specific consumption of fuel can be decreased. Further, the combustion effect may be improved so as to protect the environmental pollution of exhausting gas. Still further, the invention may be economical and practical.

Although the invention has been described in its preferred form with a certain degree of particularity, it is to be understood that the present disclosure of the preferred form can be altered in the details of construction and various combinations and arrangements of parts may be resorted to without departing from the spirit and scope of the invention as hereinafter claimed.

What is claimed is:

1. Exhaust apparatus for use with internal combustion engines, comprising an outer pipe provided with opposite end portions having diameters nearly the same as that of the engine exhaust pipe, an intermediate portion having a diameter larger than that of said end portions, the respective opposite ends of the outer pipe being joined to said intermediate portion by a pair of oppositely directed tapered sections, an inner pipe contained within said intermediate portion and having a diameter substantially the same as that of said exhaust pipe, said inner pipe being disposed concentrically with respect to the outer pipe and in axial alignment with said exhaust pipe, the respective end margins of the inner pipe being spaced from the inner walls of said tapered sections to provide two parallel concentric spaces for gases moving between said opposite end portions of the outer pipe, means defining a plurality of parallel helical passages extending longitudinally between said end portions in the space between said inner and outer pipes, and at least two groups of helically disposed fins within said inner pipe and positioned respectively near the respective ends thereof.

2. The invention defined in claim 1, wherein the diameter of the intermediate portion of said outer pipe is greater than the diameter of said exhaust pipe and is approximately the same length as the length of the inner pipe, the angle of inclination of the helical passages and fins is greater than 45° with respect to the axis of the inside pipe.

3. The invention defined in claim 1, wherein a clamping pipe encircles as least one of said end portions of the outer pipe in spaced relationship thereto for connection with said exhaust pipe, the end of the exhaust pipe being received within the space between said end portion and clamping ring.

4. The invention defined in claim 3, wherein the outer margin of said end portion is radially outwardly tapered for engagement with the inner peripheral surface of the exhaust pipe.

5. The invention defined in claim 1, wherein the parallel passages in the space between the inner and outer pipes have a pitch equal to at least one turn for the length of the inside pipe.

6. The invention defined in claim 5, wherein the pitch of said passages is between one and two turns for the length of the inside pipe.

7. The invention defined in claim 5, wherein each of said groups of helically disposed fins comprises three fins circumferentially spaced from each other by 120° and arranged at an angle of greater than 45° with respect to the longitudinal axis of the pipe.

* * * * *